A. VISEL.
ARTIFICIAL ARM.
APPLICATION FILED FEB. 26, 1914.
1,111,508.
Patented Sept. 22, 1914.
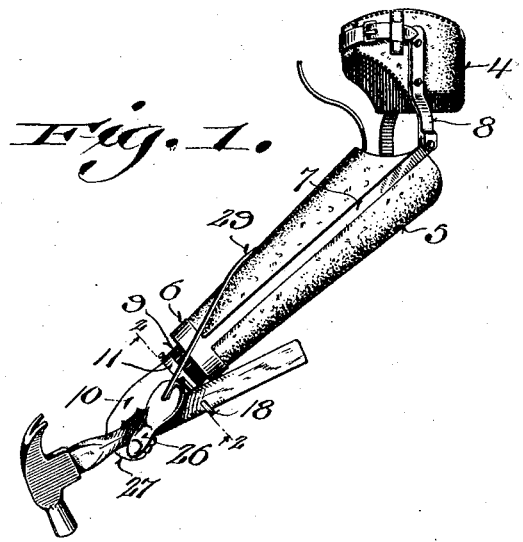
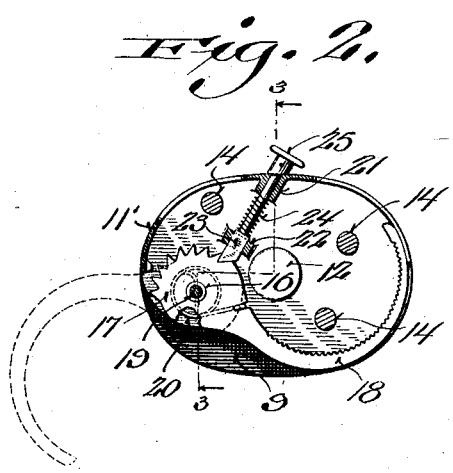
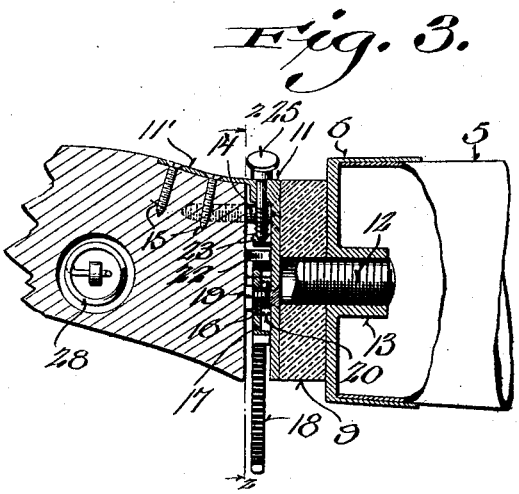

UNITED STATES PATENT OFFICE.

ADOLF VISEL, OF MILWAUKEE, WISCONSIN, ASSIGNOR OF ONE-HALF TO SAMUEL W. LEEMING, OF MILWAUKEE, WISCONSIN.

ARTIFICIAL ARM.

1,111,508. Specification of Letters Patent. Patented Sept. 22, 1914.

Application filed February 26, 1914. Serial No. 821,119.

*To all whom it may concern:*

Be it known that I, ADOLF VISEL, a citizen of the United States, and resident of Milwaukee, in the county of Milwaukee and State of Wisconsin, have invented certain new and useful Improvements in Artificial Arms; and I do hereby declare that the following is a full, clear, and exact description thereof.

My invention consists in what is herein particularly set forth with reference to the accompanying drawings and pointed out in the claims of this specification, its object being to provide artificial arms each preferably provided with a spring-controlled gripping-thumb common in the art, and with a spring-controlled pivotally adjustable wrist-hook by which to grip tool handles and other devices, the wrist-hook being retractive in a chamber provided for its concealment when not in use, but said wrist-hook may constitute part of an artificial arm having a hand of which the thumb is not articulated with the remainder thereof, or of such an arm provided with pliers or some other device instead of the semblance of a hand, as is also common in the art.

Figure 1 of the drawings represents a perspective view of one of my improved artificial arms having the hand and a wrist hook member thereof grasping the handle of a hammer; Fig. 2, a sectional view indicated by line 2—2 in Figs. 1 and 3, and Fig. 3, a sectional view indicated by line 3—3 in Fig. 2.

Referring by numerals to the drawings 4 indicates a band with which to engage an arm-stump of a person utilizing an artificial forearm 5 fitted at its outer end in a socket 6 having lever extensions 7 in articulation with brackets 8 attached to said sleeve, all of which is usual in the art, as is also a cushion wrist-block 9 facing said socket.

Fastened to the wrist-end of the hand-piece 10 of the arm is a housing 11, and extending rearward from the housing through the block 9 is a shank 12 having screw-thread engagement with an inner nipple 13 of the socket 6. As a matter of detail, the housing 11 and a flange 11' of the same are fastened to the hand-piece 10 by screws 14, 15, and the outer end of the shank 12 is upset in connection with said housing or otherwise suitably fastened thereto, it being common in the art to provide the hand-piece of an artificial arm with a similar shank.

Within the housing 11 loose on a stud 16 of the same is the ratchet end 17 of a hook 18 that is detachably secured in place by the head of a screw 19 engaging said stud and the inner face of the hook is preferably serrated. Engaging the stud 16 and the hook 18 are the ends of a spiral-spring 20 of suitable strength under tension. The housing is provided with guide-lugs 21 and 22 for a dog 23 that engages with the ratchet-end 17 of the hook 18, and a spiral spring 24 is employed on the shank of the dog between a shoulder of said dog and the lug 21 in which said shank is guided, said dog being retracted against resistance of the spring. Outside of the housing 11, the shank end of the dog 23 has a knob 25 fast thereon.

The hand piece 10 of the arm is shown provided with a spring-controlled articulated thumb 26 that grips against the forefinger 27 of the clenched hand as is usual in the art, the thumb-controlling spring 28 being shown in Fig. 3, within a socket of said handpiece. Shown in connection with the thumb 26 is the usual cord 29 designed for connection with a body-harness of the cripple equipped with the artificial arm.

In practice, a stretching forward of the artificial arm causes a draw of the cord 29 upon the thumb 26 to pull said thumb more or less out of normal position, and an object interposed between said thumb and adjacent forefinger of the hand is grasped when said cord is slackened, owing to the contractive power of the spring 28, this being customary practice. For secure holding of some objects, particularly tool handles, the grasp between the thumb and adjacent portion of the remainder of the hand is too infirm, in which case the hook 18 is utilized in conjunction with said thumb as an adjustable gripping-member of the hand. To utilize the hook, the dog 23 is retracted permitting the spring 20 to react and throw said hook out of the housing 11 into the position shown by dotted lines in Fig. 2. The dog being released, its controlling spring 24 returns it to normal position in the path of the ratchet-end 17 of the hook 18, and said hook is then swung in step by step to position to grasp an object interposed between it and its housing, the dog 23 serving to hold the hook in its adjusted position. It is also to be noted that the hook-gripped object is caught against the arm socket 6 upon which comes the greatest strain in the use of said object especially if the same be the handle of a tool, and the hook being serrated, as aforesaid, it takes the best possible hold.

I claim:

1. An artificial-arm having a housing at the wrist thereof, a spring-controlled hook having a ratchet-end thereof pivoted in the housing into which said hook as a whole is retractive, and a spring-controlled ratchet-engaging dog guided in said housing through which its shank extends.

2. An artificial-arm having a housing at the wrist thereof and a gripping means forward of the housing, a spring-controlled hook having a ratchet-end thereof pivoted in the housing into which said hook as a whole is retractive, and a spring-controlled ratchet-engaging dog guided in said housing through which its shank extends.

3. An artificial arm having a housing at the wrist thereof, a pivot-stud within the housing, a spring-controlled hook having a ratchet-end loose on the stud, means by which the hook is detachably secured on said stud, said hook being retractive in said housing; and a spring-controlled ratchet-engaging dog guided in the housing through which its shank extends.

4. An artificial-arm having a housing at the wrist thereof, a pivot-stud within the housing, a hook having a ratchet-end in detachable engagement with the stud to turn thereon, a spiral-spring under tension secured at its ends to said stud and hook, the hook being retractive in said housing; and a spring-controlled ratchet-engaging dog guided in the housing through which its shank extends.

In testimony that I claim the foregoing I have hereunto set my hand at Milwaukee, in the county of Milwaukee and State of Wisconsin in the presence of two witnesses.

ADOLF VISEL.

Witnesses:
   GEO. W. YOUNG,
   M. E. DOWNEY.

---

Copies of this patent may be obtained for five cents each, by addressing the "Commissioner of Patents, Washington, D. C."